(12) United States Patent
Selin

(10) Patent No.: US 7,163,604 B2
(45) Date of Patent: Jan. 16, 2007

(54) PRODUCTION OF FIBER SUSPENSION FROM WASTE PAPER

(75) Inventor: Roland Selin, Bromma (SE)

(73) Assignee: JLR Pulping Systems AB, Bromma (SE)

( * ) Notice: Subject to any disclaimer, the term of this patent is extended or adjusted under 35 U.S.C. 154(b) by 123 days.

(21) Appl. No.: 10/475,660

(22) PCT Filed: Apr. 19, 2002

(86) PCT No.: PCT/SE02/00773

§ 371 (c)(1),
(2), (4) Date: Mar. 12, 2004

(87) PCT Pub. No.: WO02/086229

PCT Pub. Date: Oct. 31, 2002

(65) Prior Publication Data

US 2004/0140069 A1    Jul. 22, 2004

Related U.S. Application Data

(60) Provisional application No. 60/285,235, filed on Apr. 23, 2001.

(51) Int. Cl.
*D21B 1/08* (2006.01)
(52) U.S. Cl. ............................ 162/4; 162/55; 162/261; 241/24.1; 241/28; 241/68
(58) Field of Classification Search ...................... None
See application file for complete search history.

(56) References Cited

U.S. PATENT DOCUMENTS 2,424,726 A * 7/1947 Wells ...................... 241/46.11

3,085,756 A * 4/1963 Danforth et al. ................ 241/5
3,362,691 A * 1/1968 Shilling ...................... 366/197
3,547,357 A * 12/1970 Johnson ........................ 241/28

(Continued)

FOREIGN PATENT DOCUMENTS

DE          29 08 660         9/1980

(Continued)

OTHER PUBLICATIONS

Smook, Gary A., Handbook for Pulp and Paper Technologists, 2nd ed, Angus Wilde Publications, 1992, pp. 211-212.*

*Primary Examiner*—Steven P. Griffin
*Assistant Examiner*—Dennis Cordray
(74) *Attorney, Agent, or Firm*—Young & Thompson

(57) ABSTRACT

A fiber suspension is produced from waste paper by first filling a pulper with a batch of the waste paper. The pulper is operated to partly defibrate the batch of waste paper substantially without disintegrating coarse imputities into finer impurities. The partly defibrated batch of waste paper is separated into a coarse reject fraction and an initial fiber suspension containing some waste paper fragments and fine impurities. The initial fiber suspension is pumped through a rotary screen apparatus provided with a tubulat fine screen and a pulper type impeller rotating coaxial with the tubular screen, but devoid of any impeller co-operant extraction plate, to defibrate waste paper fragments remaining in the initial fiber suspension and to separate the initial fiber suspension by means of the tubular fine screen into a fine reject fraction containing fine inpurities and a complete fiber suspension substantially free from impurities.

11 Claims, 3 Drawing Sheets

U.S. PATENT DOCUMENTS

| | | | | |
|---|---|---|---|---|
| 4,283,275 | A | * | 8/1981 | Heinbockel et al. ............ 209/3 |
| 4,334,984 | A | * | 6/1982 | Vagac et al. .................... 209/3 |
| 4,420,117 | A | * | 12/1983 | Peroutka et al. ......... 241/46.17 |
| 4,619,736 | A | * | 10/1986 | Henricson et al. .......... 162/261 |
| 5,137,599 | A | * | 8/1992 | Maxham ........................ 162/5 |
| 5,358,637 | A | * | 10/1994 | Hutzler et al. ............... 210/415 |
| 5,377,917 | A | * | 1/1995 | Wiljan et al. ................. 241/14 |
| 5,593,542 | A | * | 1/1997 | Wolfer et al. ................... 162/4 |
| 5,707,488 | A | * | 1/1998 | Markham ...................... 162/4 |
| 5,814,187 | A |   | 9/1998 | Fjallstrom |
| 6,131,742 | A | * | 10/2000 | Selin .......................... 209/306 |

FOREIGN PATENT DOCUMENTS

EP          0 570 757          11/1993

* cited by examiner

PRODUCTION OF FIBER SUSPENSION FROM WASTE PAPER

BACKGROUND OF THE INVENTION

The present invention relates to a process and system for producing a fiber suspension from waste paper containing coarse and fine impurities.

In the pulp and paper making industry use of recycled fibers obtained from waste paper is nowadays practised in many paper mills. A key component in the process of producing recycled fibers is the pulper. Bales of waste paper and water are supplied continuously or in batches to the pulper, in which the waste paper is defibrated by a rotating impeller (also called slushing). A so-called extraction plate, which is a special type of screen plate, co-operates with the impeller to create shearing forces on paper fragments to aid in the defibration thereof. Relatively coarse impurities in the waste paper, such as scraps, metal and plastic foils and the like, are retained by the extraction plate, whereas a created fiber suspension containing relatively fine impurities, such as printing ink, coating components, plastic particles, stickies (glue particles) and the like may pass the extraction plate for further processing, i.e removal of fine impurities.

A problem with recycled fibers is that their quality decreases each time they are recycled, because of the mechanical treatment of the fibers by process equipment, such as pumps, screens and refiners. With increasing use of recycled fibers the share of previously recycled fibers contained in waste papers increases. In consequence, it is being more and more difficult to fulfil the uniformity requirement on paper and paperboard produced from recycled fibers thus including increasing amounts of fibers of poor quality. Besides, over time the uniformity requirements tend to continuously be tightening up, which makes it even more difficult to fulfil them.

The necessary mechanical treatment of the waste paper in order to achieve defibration gives rise to another problem, namely that large amounts of extremely short fibers, so-called fines, are created. A great share of fines in a fiber suspension used for producing paper in a paper machine is disadvantageous for many reasons. Firstly, the water permeability of the pulp layer formed in the paper machine will be poor causing decreased capacity. Secondly, the costs for drying the paper will be higher. Thirdly, a large amount of fines distributed in the produced paper results in poorer strength properties of the paper.

A most important paper quality property is cleanliness. To achieve good cleanliness different types of impurities have to be eliminated from the suspension of recycled fibers, which requires advanced cleaning equipment. The cleaning equipment currently in use typically includes several separate interconnected cleaning stations in which the fiber suspension is cleaned in successive stages. However, a problem with this current cleaning equipment is that more fines are created in every cleaning station because of the mechanical treatment of the fibers therein. Besides, some impurities are also disintegrated into smaller particles by the mechanical treatment. This requires installation of further cleaning stations, typically fine screen apparatus as final cleaning stations, capable of separating such smaller particles. Consequently, the traditional system for producing useful clean fiber suspensions from waste paper is complex, relatively expensive and requires a large energy supply for its operation.

SUMMARY OF THE INVENTION

An object of the present invention is to provide a method and system for producing a suspension of recycled fibers of high quality, in the sense of good cleanliness and good dewatering and strength properties.

Another object of the invention is to provide an inexpensive system for producing a suspension of recycled fibers with less equipment, low energy consumption and good runnability.

Yet another object of the invention is to provide a method and system for producing a high yield suspension of recycled fibers in the sense of low fiber losses.

Accordingly, in accordance with a first aspect of the present invention there is provided a method of producing a fiber suspension from waste pasper comprising the steps of:

a) filling a pulper with a batch of waste paper in water, the pulper being provided with an extraction plate and a rotating impeller co-operating with the latter to create shearing and cutting forces on the paper;

b) operating the pulper to partly defibrate the batch of waste paper by the action of the rotating impeller, substantially without disintegrating coarse impurities into finer impurities, c) diluting the partly defibrated batch of waste paper;

d) separating the partly defibrated batch of waste paper by means of the extraction plate into a coarse reject fraction containing coarse impurities and an initial fiber suspension containing some waste paper fragments and fine impurities;

e) discharging the initial fiber suspension from the pulper;

f) pumping the initial fiber suspension through a rotary screen apparatus provided with a tubular fine screen and a pulper type impeller rotating coaxial with the tubular screen, but devoid of any impeller co-operant extraction plate, to defibrate waste paper fragments remaining in the initial fiber suspension by the action of the pulper type impeller and to separate the initial fiber suspension by means of the tubular fine screen into a fine reject fraction containing fine impurities and a complete fiber suspension substantially free from impurities.

Thus, the gist of the present invention is to deliberately operate the pulper so that coarse impurities are not disintegrated into finer impurities at the expense of an increased amount of undefibrated waste paper fragments in the initial fiber suspension discharged from the pulper. This results in two important advantages. Firstly, substantially all coarse impurities contained in the batch of waste paper are separated by the extraction plate and only an insignificant amount of finer impurities resulted from disintegration of coarse impurities are added to the original amount of fine impurities that existed in the batch of waste paper. Secondly, fewer fines are produced by the careful operation of the pulper. The small waste paper fragments remaining in the initial fiber suspension are easily defibrated by the pulper type impeller of the rotary screen apparatus, while the fine impurities are separated through the tubular fine screen. Since the pulper type impeller does not co-operate with any extraction plate no further fines are produced as a result of cutting forces, nor any further finer impurities. Preferably, the pulper is operated so that not more than about 50% of the entire energy required for accomplishing complete defibration of the batch of waste paper is consumed during the operation of the pulper. Consequently, the rotary screen apparatus is operated so that the remaining energy required for accomplishing complete defibration of the batch of waste paper is consumed during the operation of the rotary screen apparatus.

Accordingly, the complete fiber suspension leaving the rotary screen apparatus is substantially free from impurities which drastically reduces the need for subsequent fine cleaning stages. Fewer cleaning stations means decreased energy consumption. In addition, the complete fiber suspension contains substantially intact fibers and only a minor amount of newly produced fines, which enables production of highly water permeable pulp and paper having good strength properties.

Unlike continuous operation of the pulper typically practised traditionally, the batch operation of the pulper in accordance with the present invention enables step b) to be performed by rotating the impeller at different speeds during different periods of time. Thus, step b) may be performed by rotating the impeller at a speed that increases step by step during an initial operation stage, in which the defibration of the waste paper is started, at a maximum speed during a main operation stage following the initial operation stage and at a speed that decreases step by step during a final operation stage following the main operation stage. As a result, the dwell time of the batch of waste paper in the pulper can be significantly reduced by rotating the impeller at a high speed, much higher than is possible for continuous operation, for example at least 150 rpm, during the main operation stage.

To avoid disintegration of coarse impurities the duration of the initial operation stage should be less than 4 minutes and the duration of the main operation stage should be less than 7 minutes.

Preferably, step c) is performed so that the fiber concentration of the initial fiber suspension is at least 4% by weight, preferably at least 6%, which is known as a high consistency pulp among those skilled in the art. The operation of the rotary screen apparatus with such a "thick" fiber suspension is favourable, because the defibration of remaining waste paper fragments is more efficient and careful, i.e. few fines are produced.

The process of the invention may further comprise the steps of:

g) separating coarse impurities from the coarse reject fraction to form a recovered fiber fraction containing some fibers, and h) feeding the recovered fiber fraction back to the pulper together with the next batch of waste paper to be defibrated.

As a result, the fiber yield is increased.

The process may further comprise the steps of:

i) separating fine impurities from the fine reject fraction to form a further recovered fiber fraction containing some fibers, and k) feeding the further recovered fiber fraction to the pulper together with the next batch of waste paper to be defibrated.

As a result, the fiber yield is even more improved.

Suitably, steps h) and k) are performed by mixing the recovered fiber suspension and further recovered fiber suspension with each other to form a mixed fiber suspension and then feeding the mixed fiber suspension back to the pulper.

In accordance with a second aspect of the present invention, there is provided a system for producing a fiber suspension from waste paper containing coarse and fine impurities, comprising:

a pulper for receiving a batch of waste paper, the pulper having a motor, an impeller rotatable by the motor and an extraction plate for co-operating with the impeller to create shearing forces on the batch of waste paper to cause partial defibration thereof, dilution means for diluting the partly defibrated batch of waste paper with water, the extraction plate provided for separating diluted and partly defibrated waste paper into a coarse reject fraction containing coarse impurities and an initial fiber suspension containing some waste paper fragments and fine impurities, means for discharging the initial fiber suspension from the pulper, a rotary screen apparatus having a tubular fine screen, a motor and a pulper type impeller rotatable by the motor coaxial with the tubular fine screen, the rotary screen apparatus being devoid of any impeller co-operant extraction plate, a pump for pumping the initial fiber suspension discharged from the pulper through the rotary screen apparatus to defibrate waste paper fragments remaining in the initial fiber suspension by the action of the pulper type impeller and to screen a fine reject fraction of the initial fiber suspension containing fine impurities through the tubular fine screen, to form a complete accept fiber suspension of the initial fiber suspension substantially free from impurities, and means for discharging the complete accept fiber suspension from the rotary screen apparatus.

The motor may be adapted to rotate the impeller at different speeds during different periods of time, when the pulper is operated.

The tubular screen of the rotary screen apparatus may have circular screen holes, the diameter of which is in the range of 1.4–2.0 mm, or elongated screen slots, the width of which is in the range of 0.2–0.4 mm, preferably 0.30–0.35 mm.

In accordance with an embodiment of the invention, the system further comprises a coarse reject separator for separating the coarse impurities from the coarse reject fraction to form a recovered fiber fraction containing some fibers. Feed-back means may be provided for feeding the recovered fiber fraction to the pulper.

In accordance with another embodiment of the invention, the system further comprises a fine reject separator for separating the fine impurities from the fine reject fraction to form a recovered fine fiber fraction containing some fine fibers. The feed-back means may also feed the recovered fine fiber fraction to the pulper. Preferably, the feed-back means comprises a chest for receiving and mixing the recovered fiber fraction and recovered fine fiber fraction to form a mixed fiber fraction, and a pump for pumping the mixed fiber fraction to the pulper.

DETAILED DESCRIPTION OF THE INVENTION

Figure 1:
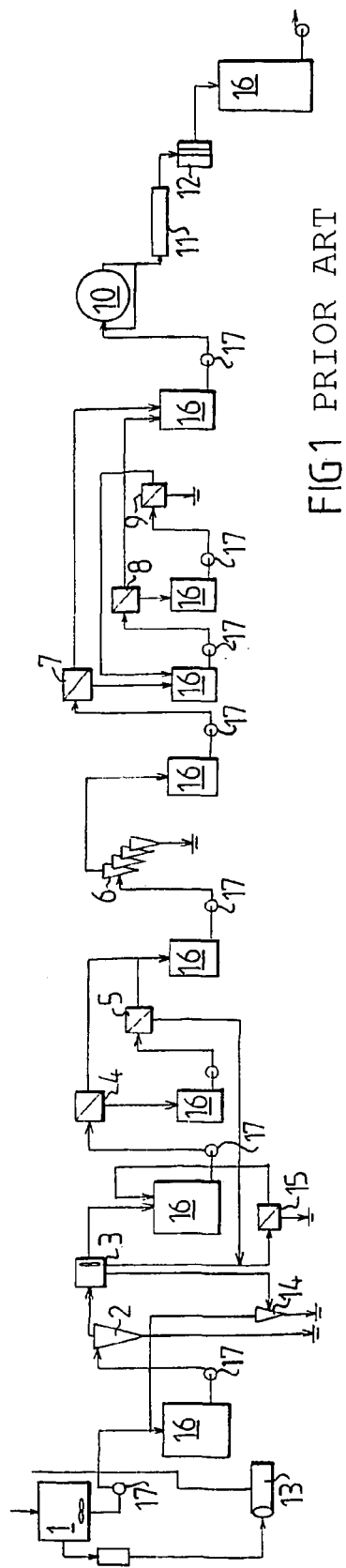
FIG. 1 is a schematic diagram of a system for producing a fiber suspension from waste paper in accordance with prior art.

Referring to the drawing figures, like reference numerals designate identical or corresponding elements throughout the several figures.

FIG. 1 schematically shows a traditional system for producing a fiber suspension from waste paper comprising a primary big pulper 1 for continuous slushing of waste paper, a high density cleaner 2 (hydrocyclone) for separating heavy impurities from the fiber stream leaving the pulper 1 and a secondary small pulper 3 for defibration of waste paper fragments remaining in the fiber stream leaving the cleaner 2. The secondary pulper 3 is provided with an extraction plate having screen holes of 2.8 mm in diameter. The traditional system further comprises coarse screens 4,5 having holes of 1.8 mm in diameter for separating coarse impurities from the fiber stream leaving the small pulper 3, a cleaner plant 6 (including hydrocyclones) for separating sand and stickies from the fiber stream leaving the coarse screens 4,5 and fine screens 7,8,9 having slots of 0.45 mm in width for separating fine impurities from the fiber stream leaving the cleaner plant 6. The complete cleaned fiber suspension leaving the fine screens 7–9 is thickened in a disc filter 10 and a screw press 11. Finally, the thickened fiber suspension is dispersed in a dispersion device 12.

The traditional system further comprises a trash drum 13 for dewatering trash separated from the waste paper in the primary pulper 1. There is a sand cleaner 14 (hydrocyclone) for separating a high density reject fraction leaving the secondary pulper 3 into a reject containing sand and a fiber containing accept fraction, which is fed back to the fiber stream leaving the primary pulper 1. A reject sorter 15 (screen) is provided for separating a combined coarse reject fraction into a coarse reject and and a fiber containing accept fraction, which is fed back to the fiber stream leaving the secondary pulper 3. The combined coarse reject fraction is formed by a combination of a first coarse reject fraction leaving the secondary pulper 3 and a second coarse reject fraction leaving the coarse screen 5. The various fiber streams are temporarily accumulated in eight water chests 16 and nine pumps 17 are required for pumping the various fiber streams in the system.

Figure 2:
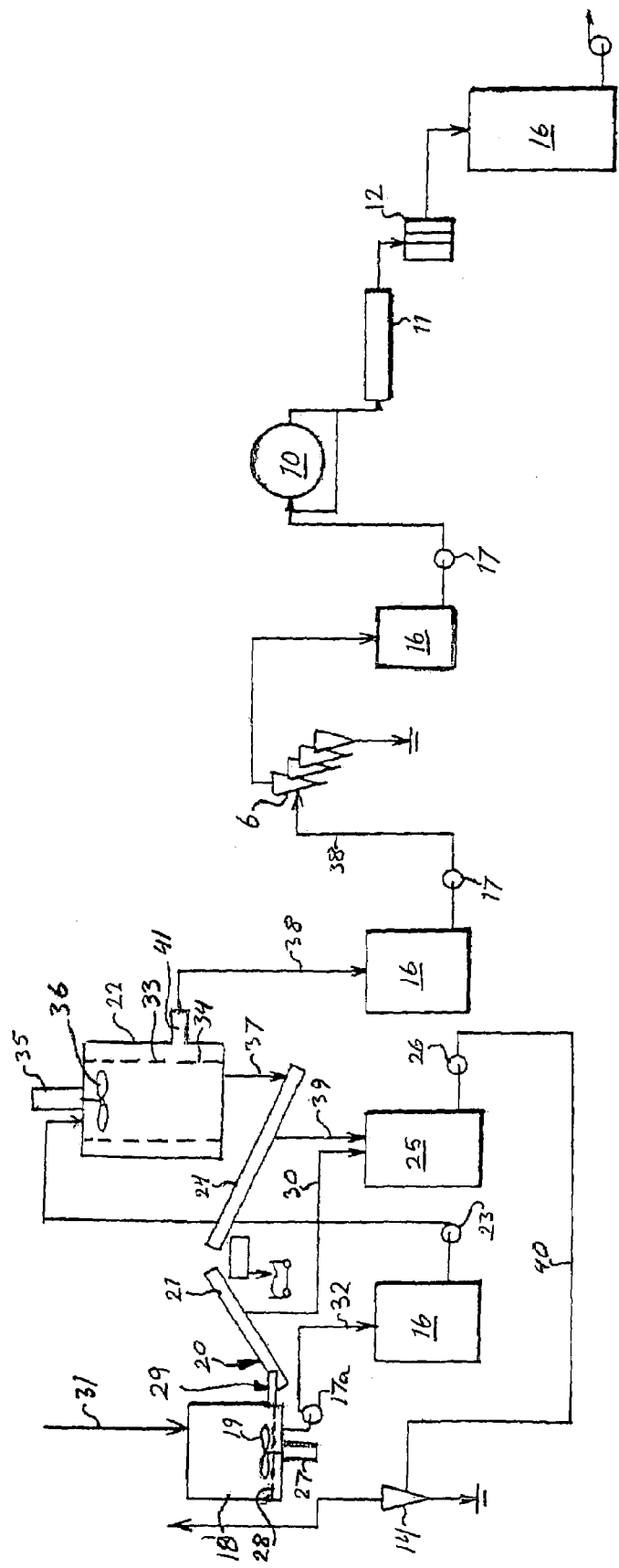
FIG. 2 is a schematic diagram of a system for producing a fiber suspension from waste paper in accordance with the present invention.

FIG. 2 schematically shows a new system in accordance with the present invention for producing a fiber suspension from waste paper containing coarse and fine impurities. The new system comprises a pulper 18 designed for slushing of waste paper in batches. The pulper 18 may be of the type described in Swedish patent application no. 0001053-8. Thus, the pulper 18 has an impeller 19 rotating by a motor 27 about a vertical axis, an extraction plate 28 situated below and close to the impeller 19 to co-operate with the impeller during operation, and a coarse reject discharge device 20 for discharging a developed coarse reject fraction 29 containing coarse impurities and some long and short fibers. The discharge device 20 comprises a coarse reject separator 21 in the form of an inclined conveyer for separating the coarse impurities from the coarse reject fraction to form a recovered fiber fraction 30 containing some long and short fibers. Dilution means 31 is provided for supplying water to the pulper 18.

A rotary screen apparatus 22 is provided for receiving an initial fiber suspension 32 leaving the pulper 18. The apparatus 22, which may be a multi-functional coarse screen supplied by Thermo Black Clawson Inc. (former Gauld Equipment) or a multi-functional coarse screen Type T supplied by GL & V (former Alfa Laval Celleco AB), comprises a tubular fine screen 33 having screen slots 34 of 0.35 mm in width, a motor 35 and a pulper type impeller 36 rotatable by the motor 35 coaxial with the tubular fine screen 33. There is no extraction plate, like the one in the pulper 18, arranged in the rotary screen apparatus 22. There is a pump 23 for pumping the initial fiber suspension 32 through the rotary screen apparatus 22 to defibrate waste paper fragments remaining in the initial fiber suspension 32 by the action of the rotating pulper type impeller 36 and to separate the initial fiber suspension 32 by means of the tubular fine screen 33 into a fine reject fraction 37 containing fine impurities and a complete fiber suspension 38 substantially free from impurities. The apparatus 22 is provided with a means 41 for discharging the complete fiber suspension 38 from the apparatus 22. A fine reject separator 24 in the form of an inclined screw conveyer is provided for separating fine impurities from the fine reject fraction 37 to form an additional recovered fiber fraction 39 containing some fibers.

A chest 25 receives and accumulates the recovered fiber fractions from the coarse reject separator 21 and fine reject separator 24, respectively, whereby the two recovered fiber fractions form a mixed recovered fiber fraction 40. A pump 26 is adapted to pump the mixed fiber fraction 40 from the chest 25 through a sand cleaner 14 to a chest (not shown) for later supply by the dilution means 31 to the next batch of waste paper.

A cleaner plant 6 as described above in connection with the traditional system receives the complete fiber suspension 38 leaving the rotary screen apparatus 22. The complete fiber suspension 38 free from sand and stickies is pumped directly to a disc filter 10 without passing any fine screens.

Figure 3:
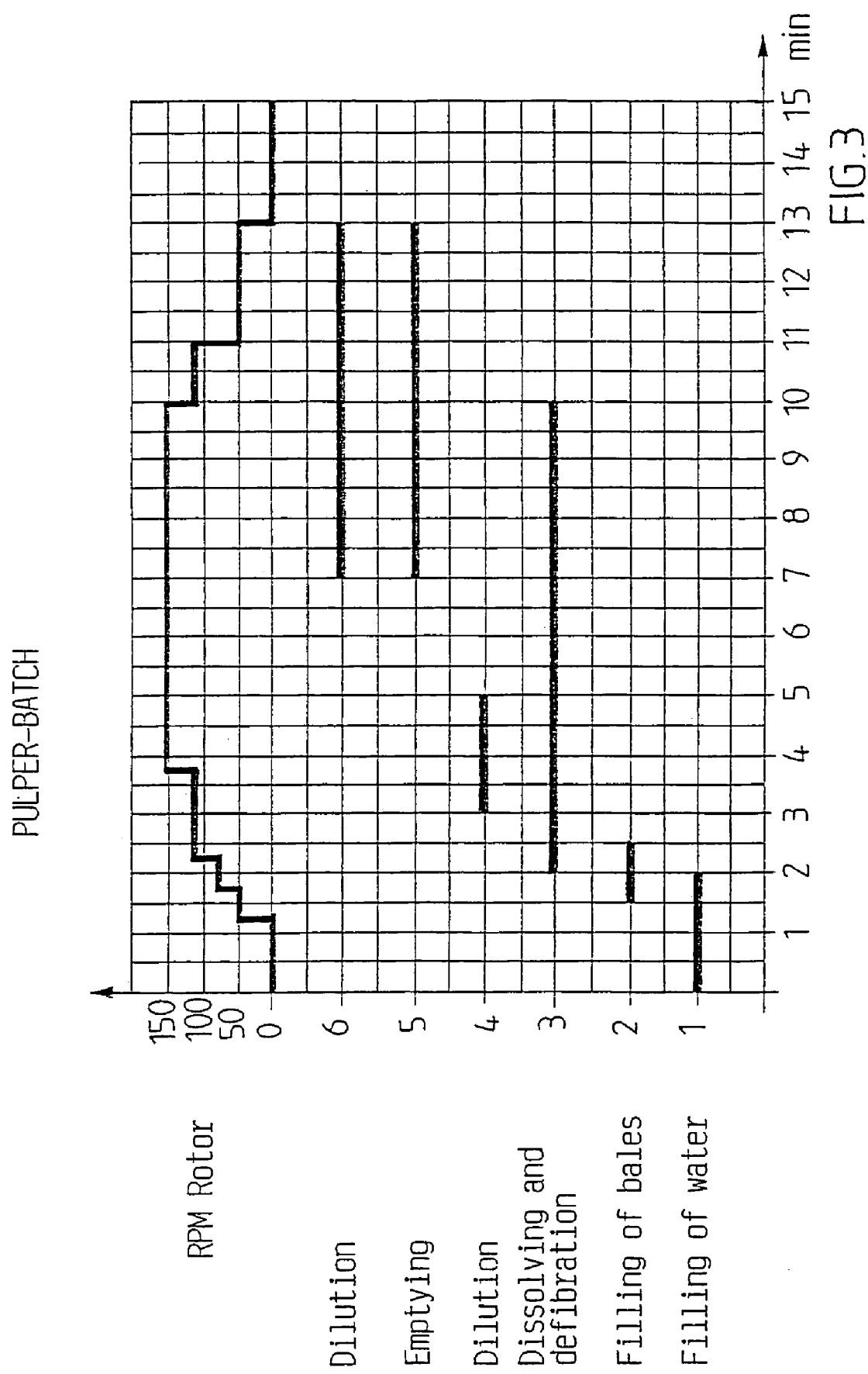
FIG. 3 is a diagram illustrating the operation of a pulper in the system of FIG. 2.

FIG. 3 is a diagram illustrating how the impeller 19 of the pulper 18 may be rotated at different speeds during different periods of time. Thus, during an initial operation stage I, in which the waste paper is cut by the impeller 19 into smaller pieces, the impeller 19 is rotated at a speed that increases step by step from zero to 150 rpm. During a main operation stage II, in which the main defibration of the waste paper takes place, the impeller 19 is rotated at a maximum speed of 150 rpm. During a final operation stage III, the rotational speed of the impeller is decreased step by step from 150 rpm to zero. The entire operation of a batch of waste paper takes about 15 min. The time periods of the different operation stages I–III are chosen so that not more than about 50% of the entire energy required for accomplishing complete defibration of the batch of waste paper is consumed during the operation of the pulper 18. Consequently, the remaining energy required for accomplishing complete defibration of the batch of waste paper is consumed during the operation of the rotary screen apparatus 22.

In the diagram of FIG. 3 there is also illustrated the different process steps that occur during the operation of the pulper 18. Thus, step 1 denotes filling the pulper 18 with water including the mixed recovered fiber fraction 40 during 2 minutes, step 2 denotes filling the pulper 18 with a batch of waste paper during about 1 minute and step 3 denotes dissolving and defibration of the waste paper which takes about 8 minutes. Furthermore, step 4 denotes dilution of the formed paper slurry with water 2 minutes and step 5 and 6 denote discharging the formed paper slurry from the pulper 18 while at the same time diluting the paper slurry with water during an interval of about 6 minutes to form an initial fiber suspension having a thick consistency in the range of 0.4 to 0.6% by weight. As appears from the diagram of FIG. 3 many of the process steps 1–6 overlap one another or take place simultaneously.

The system according to the present invention illustrated in FIG. 2 is very compact as compared with the traditional system illustrated in FIG. 1. Thus, the coarse screens 4,5 and fine screens 7–9 are eliminated, the number of pumps upstream the disc filter 10 is reduced from nine to five and the number of chests upstream the disc filter 10 is reduced from eight to four. The reduced number of pumps and screens in the system of the invention results in reduced production of fines from fibers and finer impurities which is of great advantage with respect to the quality of the paper to be produced from the final clean suspension of recycled fibers.

The invention claimed is:

1. A process of producing a fiber suspension from waste paper containing coarse and fine impurities, comprising the steps of:
   a) filling a pulper with a batch of waste paper in water, the pulper being provided with an extraction plate and a rotating impeller co-operating with the extraction plate to create shearing forces on the paper;
   b) operating the pulper by rotating the impeller at different speeds during different periods of time to partly defibrate the batch of waste paper by the action of the rotating impeller, substantially without disintegrating coarse impurities into finer impurities, wherein the impeller is rotated at a speed that increases step by step during an initial operation stage, in which the defibration of the waste paper is started;
   c) operating the pulper so that not more than about 50% of the entire energy required for accomplishing complete defibration of the batch of waste paper is consumed during operation of the pulper;
   d) diluting the partly defibrated batch of waste paper;
   e) separating the partly defibrated batch of waste paper by means of the extraction plate into a coarse reject fraction containing coarse impurities and an initial fiber suspension containing some waste paper fragments and fine impurities;
   f) discharging the initial fiber suspension from the pulper; and
   g) pumping the initial fiber suspension through a rotary screen apparatus provided with a tubular fine screen and a pulper type impeller rotating coaxial with the tubular screen, but devoid of any impeller co-operant extraction plate, to defibrate waste paper fragments remaining in the initial fiber suspension by the action of the pulper type impeller and to separate the initial fiber suspension by means of the tubular fine screen into a fine reject fraction containing fine impurities and a complete fiber suspension substantially free from impurities.

2. A process according to claim 1, wherein step d) is performed so that the fiber concentration of the initial fiber suspension is at least 4% by weight.

3. A process according to claim 1, wherein step b) is performed by rotating the impeller at a maximum speed during a main operation stage following the initial operation stage.

4. A process according to claim 3, wherein step b) is performed by rotating the impeller at a speed that decreases step by step during a final operation stage following the main operation stage.

5. A process according to claim 1, wherein the duration of the initial operation stage is less than 4 minutes.

6. A process according to claim 3, wherein the duration of the main operation stage is less than 7 minutes.

7. A process according to claim 3, wherein the rotational speed of the impeller during the main operation stage is at least 150 rpm.

8. A process according to claim 2, wherein step d) is performed so that the fiber concentration of the initial fiber suspension is at least 6% by weight.

9. A process according to claim 1, further comprising the steps of:
   h) separating coarse impurities from the coarse reject fraction to form a recovered fiber fraction containing some fibers, and
   i) feeding the recovered fiber fraction back to the pulper together with the next batch of waste paper to be defibrated.

10. A process according to claim 9, further comprising the steps of:
    j) separating fine impurities from the fine reject fraction to form a further recovered fiber fraction containing some fibers, and
    k) feeding the further recovered fiber fraction to the pulper together with the next batch of waste paper to be defibrated.

11. A process according to claim 10, wherein steps j) and k) are performed by mixing the recovered fiber suspension and further recovered fiber suspension with each other to form a mixed fiber suspension and then feeding the mixed fiber suspension back to the pulper.

* * * * *